Figure 1:
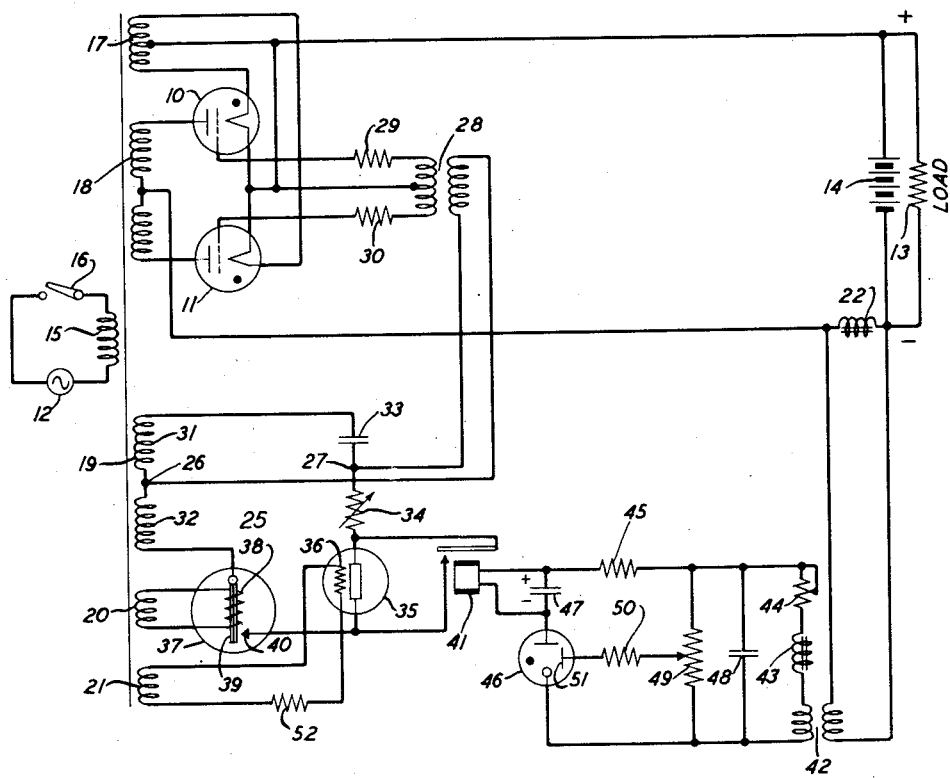

May 29, 1951 G. W. MESZAROS 2,554,837
TIME-DELAY CONTROL APPARATUS
Filed April 18, 1946

INVENTOR
G. W. MESZAROS
BY
*G. F. Heuerman*
ATTORNEY

Patented May 29, 1951

2,554,837

UNITED STATES PATENT OFFICE 2,554,837

TIME DELAY CONTROL APPARATUS

George W. Meszaros, New York, N. Y., assignor to Bell Telephone Laboratories, Incorporated, New York, N. Y., a corporation of New York Application April 18, 1946, Serial No. 662,952

8 Claims. (Cl. 321—42)

This invention relates to control apparatus, and particularly to apparatus for controlling the space current in a space current rectifying device to prevent damaging the cathode of the device while it is being heated to operating temperature.

An object of the invention is to provide an improved control circuit which may be utilized for controlling the space current in a space discharge device.

A further object of the invention is to provide an improved circuit for controlling the phase of an alternating control voltage.

In a specific embodiment of the invention, herein shown and described for the purpose of illustration, there is provided a space discharge rectifier for rectifying current from an alternating current supply source and for supplying the rectified current to a load. For the purpose of preventing damaging the cathode of the space current rectifying tubes while they are being heated to operating temperature by current from the alternating current supplying source, there is impressed upon the control electrode-cathode circuit of each rectifier tube a voltage derived from the supply source the phase of which is controlled to prevent the flow of space current in each rectifier tube during an initial period and for subsequently causing the space current to gradually increase until the full output of the rectifier is reached. The phase of the voltage impressed upon the control electrode-cathode circuit of the rectifier tubes is controlled by a phase shift bridge circuit having four impedance arms. Two arms are formed by two equal portions of a secondary winding of a transformer having a third winding to which current is supplied from the alternating current supply source. A condenser is provided in a third arm. The fourth arm of the bridge comprises, in series, an ohmic resistor, an indirectly heated thermistor and the contacts of a thermostatic switch. Thermistors are made from a class of materials known as semi-conductors which have a relatively large negative temperature coefficient of resistance. They are described in an article by G. L. Pearson in Bell Laboratories Record for December 1940, page 106 et seq.

The supply of current from the supply source is initiated simultaneously to the cathodes of the rectifier tubes, to the heater element of the thermostatic switch and to the heater element of the thermistor. While the contacts of the thermostatic switch are open, the control electrode-cathode potential wave applied to the rectifier tubes is substantially 180 degrees out of phase with respect to the anode-cathode potential wave so that no space current flows in the anode-cathode circuit of the rectifier tubes. When the temperature of the thermostatic switch has increased sufficiently due to current supplied to its heater element, the switch operates to complete the fourth arm of the bridge circuit and, as a result, the phase of the control electrode-cathode voltage is shifted sufficiently to cause a small space current to flow in the rectifier tubes. As the resistance of the thermistor in the fourth arm of the bridge circuit decreases in response to the heating current supplied thereto, the phase of the output voltage of the bridge circuit is further shifted to cause the space current of the rectifier tubes to increase gradually. There is provided a relay and a circuit for supplying operating current to its winding when the load current reaches a sufficient amplitude. The operation of this relay completes a short-circuiting path across the thermistor element to further reduce the resistance of the fourth bridge arm and thereby cause the rectifier output to increase to its normal operating value.

The invention will now be described with reference to the accompanying drawing, in which:

Fig. 1 is a schematic view of a current rectifier embodying the invention; and

Figure 2:
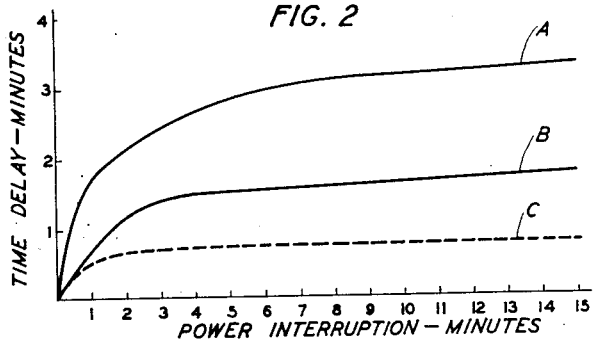

Fig. 2 consists of curves to which reference will be made in describing the operation of the circuit shown in Fig. 1.

Referring to the drawing, a full wave rectifier, comprising two gas-filled rectifier tubes 10 and 11 each having an anode, a cathode and a control electrode, rectifies current from an alternating current source 12 and the rectified current is supplied to a load 13 and to a battery 14 connected across the load 13. The tubes 10 and 11 may be of the Continental Electric Company CE-304 type, for example. There is provided a transformer having primary winding 15 to which current is supplied from source 12 when switch 16 is closed and having secondary windings 17, 18, 19, 20 and 21. Heating current is supplied to the cathodes of tubes 10 and 11 from transformer winding 17 a mid-tap of which is connected to the positive load terminal. One end terminal of secondary transformer winding 18 is connected to the anode of tube 10, the other end terminal of winding 18 is connected to the anode of tube 11 and a mid terminal of this winding is connected through the winding of the inductance coil 22 to the negative load terminal.

The average space current in each of the rectifier tubes 10 and 11 is determined by the phase of the control voltage impressed upon the control electrode-cathode circuit of each tube with respect to its anode-cathode voltage, the space current in each tube being zero when the two voltages are 180 degrees out of phase and a maximum amplitude when the two voltages are in phase, or nearly so. The control voltage for the rectifier tubes 10 and 11 is obtained from a phase shift bridge circuit 25, the output terminals 26 and 27 of which are connected respectively to the terminals of the primary winding of a transformer 28. The mid-tap of the secondary winding of transformer 28 is connected to the cathodes of tubes 10 and 11, one of its end terminals is connected through 47,000-ohm resistor 29 to the control grid of tube 10 and its other end terminal is connected through 47,000-ohm resistor 30 to the control grid of tube 11. The phase shift circuit 25 comprises four impedance arms, two of which are the equal portions 31 and 32 of transformer winding 19 and a third arm of which is a condenser 33 of 0.1 microfarad. The fourth arm of the bridge circuit comprises a variable resistor 34 and a thermistor 35 having a heater element 36, the fourth bridge arm being completed through a thermostatic switch 37 when it is operated. The switch 37 comprises a heater element 38, an armature 39 and a contact 40. Current is supplied to heater element 38 from transformer winding 20 to cause the armature 39 to flex, thereby completing a current path through the armature 39 and contact 40. Current is supplied from transformer winding 21 to thermistor heater 36 through resistor 52, thereby heating the thermistor element and causing the resistance of the fourth arm of the phase shift bridge 25 to decrease. A relay 41 when energized completes a short-circuiting path across the thermistor 35, thereby further reducing the resistance of the fourth arm of the bridge 25. For energizing the winding of relay 41 there is provided a circuit comprising a transformer 42 having a primary winding connected across the inductance coil 22 and a secondary winding connected in a series circuit comprising an inductance coil 43, 50-ohm rheostat 44, 1500-ohm resistor 45, the winding of relay 41 and the space current path of a gas-filled, cold cathode, constant voltage tube 46 of the 313C type. A 500-microfarad condenser 47 is connected across the winding of relay 41. Two shunt paths are connected across the portion of the circuit comprising secondary winding of transformer 42, inductance coil 43 and rheostat 44 in series, a 3-microfarad condenser 48 being provided in one of the shunt paths and a potentiometer 49 being provided in the second shunt path. The elements 43, 44 and 48 are tuned to 120 cycles to develop maximum voltage across condenser 48. The variable tap of potentiometer 49 is connected through 100,000-ohm resistor 50 to a starting electrode 51 of tube 46. When the current supplied to the load reaches a sufficiently high amplitude, the alternating voltage impressed between the starting electrode 51 and the cathode of tube 46 causes the gas in the tube 46 to become ionized. The path between the anode and cathode of tube 46 thus becomes conducting and current from transformer 42 flows in a circuit including condenser 47 and the anode-cathode path of tube 46 to charge the condenser 47. When the voltage across condenser 47 reaches a sufficient amplitude, relay 41 operates to close a circuit through its armature and contact. If one of the tubes 10 or 11 should fail, the frequency input to transformer 42 changes to 60 cycles and the voltage across the tuned circuit decreases and tube 46 stops firing, releasing relay 41. Relay 41 may be provided with an additional contact, not shown, for completing an energizing circuit for an alarm, not shown, when the relay releases.

Curves A and B of Fig. 2 show the relationship between the duration of a power interruption in minutes and the delay period in minutes between the time that power is restored and the time that full output current is supplied from the rectifier to the load, curve A being for the condition of low line voltage (198 volts) and curve B being for the condition of high line voltage (222 volts). Curve C depicts the operating delay time of the thermostatic relay 37.

In starting the circuit in operation by closing switch 16, alternating voltage is impressed across transformer windings 17 to 21 and the supply of heating current to the cathodes of tubes 10 and 11 and to the heating elements 36 and 38 is initiated. The relay 37 is unactuated at first and the voltages applied to the grid-cathode circuits of tubes 10 and 11 are 180 degrees out of phase with the respective anode voltages, with the result that no anode current flows in either of the tubes. The thermostatic relay 37 operates about 45 seconds after the closure of switch 16 to complete the fourth arm of the phase shift bridge circuit 25. The phase of the grid-cathode voltages of tubes 10 and 11 is thus shifted sufficiently to cause each tube to become conducting late in each half cycle of the anode voltage when the anode is positive with respect to the cathode, thus allowing a small amplitude rectified current to be supplied to the load. The bead of thermistor 35, which is in the fourth arm of the bridge circuit, has an initial resistance of 5 to 10 megohms when switch 16 is open and, as its temperature increases due to current flowing in heater winding 36, its resistance drops to about 100,000 ohms in approximately two minutes after the closure of switch 16. As the bead resistance of the thermistor decreases over this range, the current from winding 19 flowing through it increases from a few microamperes to over 1000 microamperes, thus further heating the thermistor bead and causing its resistance to further decrease to about 40,000 ohms. At this value of thermistor resistance the phase of the grid-cathode voltages of tubes 10 and 11 has shifted by such an amount that the current supplied to the load circuit by the rectifier is over 0.3 ampere. At this load current the 120-cycle pulsating voltage across inductance coil 22 is sufficient to cause the operation of relay 41 which completes a short-circuiting path across the thermistor bead just before it becomes overloaded, thus further decreasing the resistance of the fourth bridge arm and allowing the rectifier to develop its full output. The output may be adjusted over a wide range by varying the resistance of variable resistor 34.

As will be seen from the curves of Fig. 2, the delay period is about 3.3 minutes when the line voltage is relatively low (curve A) and about 1.8 minutes when the line voltage is relatively high. For a power interruption of relatively short duration, the delay period is also relatively short. For example, for the lower line voltage (curve A), if the duration of the power interruption is one-half minute the delay time is about 1.2 minutes. This shorter delay is sufficient to protect the cathodes of tubes 10 and 11 from damage, the cathodes being heated to a cherry red color at the end of this relatively short power interruption. If the power is interrupted for less than 5 seconds, no delay is required for protecting the cathodes and no delay occurs since the thermostatic relay requires 5 seconds to cool sufficiently to open the circuit at contact 40.

The thermostatic relay is required for protecting the cathodes only when the duration of the power interruption is approximately from 5 to 45 seconds, since the bead of the thermistor 35 does not cool sufficiently in such a short period to cause the space current in tubes 10 and 11 to be reduced to an amplitude such that the cathodes will not become damaged. As seen from curve C, however, the thermostatic relay 37, per se, introduces a maximum delay of only 45 seconds so that the thermistor 35 is required, in addition to the thermostatic relay, to protect the cathodes when the power interruption is more than 45 seconds. In normal operation, these longer power interruptions may occur infrequently, perhaps only about six times a year when the rectifier is started in operation after being shut down. The fact that the thermistor bead is energized infrequently is an important advantage of the invention since a thermistor bead ages with use. If the short-circuiting path across the thermistor bead through the contacts of relay 41 were not provided, the characteristics of the thermistor would change sufficiently to change the delay characteristics of the circuit.

The time delay characteristic of the circuit can be adjusted, by changing the resistance of resistor 52, so that the delay is sufficient to prevent damage to the cathodes of the tubes 10 and 11 but yet is not excessively large. Therefore, when a power failure occurs, the interruption of the supply of rectified current to the load circuit is no longer than necessary to protect the cathodes of tubes 10 and 11 from damage when the power is restored.

What is claimed is:

1. In combination, a network comprising four impedance arms arranged between a pair of input terminals and a pair of output terminals to form a lattice structure, one of said arms comprising resistance means the resistance of which decreases in response to an increase of its temperature and a temperature responsive switching means which operates when its temperature is increased to a predetermined value to complete said one arm of said network, means for impressing an alternating voltage across said input terminals for causing an alternating voltage to be set up across said output terminals and means for increasing the temperature of said resistance means and of said switching means simultaneously.

2. In combination, a network comprising four impedance arms arranged between a pair of input terminals and a pair of output terminals to form a lattice structure, one of said arms comprising resistance means the resistance of which varies with temperature and a temperature responsive switching means which operates in response to a change of temperature to complete said one arm of said network, means for impressing an alternating voltage across said input terminals for causing an alternating voltage to be set up across said output terminals, means for changing the temperature of said resistance means and of said switching means simultaneously and means operative when said resistance means has been heated sufficiently for completing a short-circuiting path across said resistance means, thereby preventing damaging said resistance means due to excessive current flowing therethrough.

3. In combination, a network comprising four impedance arms arranged between a pair of input terminals and a pair of output terminals to form a lattice structure, one of said arms comprising resistance means the resistance of which changes in response to temperature change thereof and switching means which operates when heated to complete said one arm of said network, a heating element for said resistance means, a heating element for said switching means, means for supplying heating current to said heating elements simultaneously, and means for impressing an alternating electromotive force across said input terminals for setting up an alternating electromotive force across said output terminals.

4. In combination, a phase shifting network comprising four impedance arms arranged between a pair of input terminals and a pair of output terminals to form a lattice structure, one of said arms comprising variable resistance means and switching means for completing said one arm when operated, another of said arms comprising a condenser, means for impressing an alternating electromotive force across said input terminals for causing an output alternating electromotive force to be set up across said output terminals, means for operating said switching means for shifting the phase of said output electromotive force, means for changing the resistance of said variable resistance means for further shifting the phase of said output electromotive force and means responsive to said phase shift of said output electromotive force connected to said output terminals.

5. In combination, a phase shifting network comprising four impedance arms arranged between a pair of input terminals and a pair of output terminals to form a lattice structure, one of said arms comprising variable resistance means the resistance of which may vary over a range of values within an operating range and a first switching means for completing said one arm when operated, the impedance of said one arm being predominantly resistive, a second of said arms comprising a reactive element to make the impedance of said second arm predominantly reactive, means for impressing an alternating electromotive force across said input terminals for causing an output alternating electromotive force to be set up across said output terminals, means for operating said first switching means for shifting the phase of said output electromotive force, means for changing the resistance of said variable resistance means for further shifting the phase of said output electromotive force, and a second switching means for completing a path for short-circuiting said variable resistance means for further shifting the phase of said output electromotive force when said second switching means is operated.

6. In combination, a phase shifting network comprising four impedance arms arranged between a pair of input terminals and a pair of output terminals to form a lattice structure, one of said arms comprising variable resistance means, a first switching means for completing said one arm when said first switching means is operated and a second switching means for completing a short-circuiting path for said resistance means when said second switching means is operated, the impedance of said one arm being predominantly resistive, a second of said arms comprising a reactive element to make the impedance of said second arm predominantly reactive, means for impressing an alternating electromotive force across said input terminals for setting up an alternating electromotive force across said output terminals, means for operating said first switching means for shifting the phase of said output electromotive force, means for varying the resistance of said variable resistance means during a period following the operation of said first switching means for further shifting the phase of said output electromotive force, and means for subsequently operating said second switching means for still further shifting the phase of said output electromotive force.

7. The combination with a space current device having an anode, a cathode and a control electrode for rectifying current from an alternating current supply source and for supplying the rectified current to a load, an alternating voltage derived from said supply source being impressed upon a circuit connecting said anode and said cathode, of means for supplying current from said source to said cathode for heating it, means for impressing upon a circuit connecting said control electrode and said cathode an alternating voltage derived from said supply source, means comprising a phase shift bridge circuit for controlling the phase of the voltage impressed upon said control electrode-cathode circuit with respect to the anode-cathode voltage to control the space current in said space current device and thereby preventing damaging said cathode while it is being heated to operating temperature, said bridge circuit comprising four impedance arms arranged between a pair of input terminals and a pair of output terminals, one of said arms comprising a thermostatic control switch having a first heater element and a temperature responsive resistance means having second heater element, means for supplying current from said supply source to said first heater element to cause said switch to operate after a delay period following the starting of the supply of heating current to said cathode to complete said one bridge arm, means for simultaneously supplying current from said source to said second heater element to reduce the resistance of said resistance means and means responsive to the current supplied to the load for completing a short-circuiting path across said resistance means when the load current reaches a predetermined amplitude, thereby preventing the flow of current through said resistance means.

8. In combination, a phase shifting bridge network having input and output terminals and comprising a first and second similar impedance arms, a third predominantly reactive impedance arm and a fourth predominantly resistive impedance arm, a thermostatically operated switching means for completing said fourth impedance arm when said switching means is sufficiently heated, resistance means having a negative temperature coefficient of resistance in said fourth impedance arm, a first electric heater for said switching means, a second electric heater for said resistance means, and means for supplying alternating current from a source simultaneously to said input terminals and to said first and second electric heaters.

GEORGE W. MESZAROS.

REFERENCES CITED

The following references are of record in the file of this patent:

UNITED STATES PATENTS

| Number | Name | Date |
|---|---|---|
| 1,939,462 | Ramsay | Dec. 12, 1933 |
| 2,076,109 | Young | Apr. 6, 1937 |
| 2,083,382 | Jutson et al. | June 8, 1937 |
| 2,147,449 | Lee | Feb. 14, 1939 |
| 2,190,757 | Moyer | Feb. 20, 1940 |
| 2,236,624 | Littwin | Apr. 1, 1941 |
| 2,356,269 | Potter | Aug. 22, 1944 |
| 2,430,373 | Strobel | Nov. 4, 1947 |